US006477747B1

(12) United States Patent
Flagg

(10) Patent No.: US 6,477,747 B1
(45) Date of Patent: Nov. 12, 2002

(54) LOAD BINDER WITH LOCKING STRUCTURE

(76) Inventor: Terry Flagg, 1181 Forest Rd., Greenfield, NH (US) 03047

( * ) Notice: Subject to any disclaimer, the term of this patent is extended or adjusted under 35 U.S.C. 154(b) by 55 days.

(21) Appl. No.: 09/706,042

(22) Filed: Nov. 3, 2000

(51) Int. Cl.$^7$ .......................... A43C 11/00; A44B 21/00; F16B 19/00
(52) U.S. Cl. ................................ 24/68 CD; 24/68 CT; 24/71 R; 70/57; 254/243; 292/113
(58) Field of Search ........................ 24/68 CD, 69 T, 24/68 CT, 71 R, 116 A; 254/78, 257, 243; 70/57, 58, 258; 292/113, 247; 410/105, 110

(56) References Cited

U.S. PATENT DOCUMENTS

| 521,293 A | * | 6/1894 | Moore ...................... 24/68 CD |
| 870,944 A | * | 11/1907 | Fish ........................ 24/68 CT |
| 2,605,529 A | * | 8/1952 | Gray ........................ 24/68 CD |
| 2,919,895 A | * | 1/1960 | Johnson ...................... 254/243 |
| 3,826,469 A | | 7/1974 | Ratcliff et al. |
| 3,842,426 A | | 10/1974 | Ratcliff et al. |
| 3,848,889 A | | 11/1974 | Sharrow |
| 3,893,210 A | | 7/1975 | Hildebrand |
| 3,905,578 A | | 9/1975 | Watson |
| 3,954,252 A | | 5/1976 | Lyons |
| 3,974,668 A | | 8/1976 | McWhorter |
| 4,010,694 A | | 3/1977 | Mooney et al. |
| 4,058,291 A | | 11/1977 | Schreyer et al. |
| 4,062,206 A | | 12/1977 | McWhorter |
| 4,360,300 A | | 11/1982 | Nadherny et al. |
| 4,382,736 A | | 5/1983 | Thomas |
| 4,423,639 A | | 1/1984 | Grade et al. |
| 4,510,062 A | | 4/1985 | Crook |
| 4,658,481 A | * | 4/1987 | Seyler et al. .................. 24/704 |
| 4,683,728 A | | 8/1987 | Hailey |
| 4,693,097 A | | 9/1987 | Rivera |
| 4,717,298 A | | 1/1988 | Bott |
| 4,776,736 A | | 10/1988 | Tatina |
| 5,059,499 A | | 10/1991 | Bird |
| 5,070,582 A | | 12/1991 | Anderson |
| 5,156,506 A | | 10/1992 | Bailey |
| 5,370,482 A | | 12/1994 | Long |
| 5,429,463 A | | 7/1995 | Howell |

(List continued on next page.)

FOREIGN PATENT DOCUMENTS

| CA | 0946137 | * | 4/1974 | .............. 24/68 CD |
| DE | 0576050 | * | 4/1933 | ................. 24/69 T |
| EP | 0347395 B1 | | 3/1993 | |
| FR | 0627198 | * | 9/1927 | .............. 24/68 CT |

*Primary Examiner*—Victor Sakran
(74) *Attorney, Agent, or Firm*—Robert R. Deleault, Esq.; Mesmer & Deleault, PLLC

(57) ABSTRACT

A load binder with locking structure has a cradle portion defining two spaced arms and an actuating handle having a swinging component portion at a first end. A first pivotal connection is operatively connected to one end of the cradle between the two spaced arms and a second end of the actuating handle for relative swinging movement about a first pivotal axis between a load tightening position and a release position such that an intermediate portion of the handle is received between the two arms of the cradle. A second pivotal connection is operatively connecting a second tension element to the handle for relative pivotal movement about an axis offset from the first pivotal axis at a location to be overcenter with respect to the first axis when the handle is in a load tightening position. A locking pin has an elongated member with a first eccentric portion located near or on a first end. The two spaced arms of the cradle each has a flange portion projecting outwardly beyond the intermediate portion of the handle when the handle is in the load tightening position. Each flange portion contains an aperture having an eccentric portion adapted to receive therethrough the eccentric portion of the locking pin. The apertures are aligned with each other along an aperture axis but the eccentric portions of each flange are offset from each other.

13 Claims, 3 Drawing Sheets

U.S. PATENT DOCUMENTS

| | | | |
|---|---|---|---|
| 5,454,445 A | * 10/1995 | Berryman | 182/116 |
| 5,458,447 A | 10/1995 | Clason | |
| 5,462,318 A | * 10/1995 | Cooke | 292/113 |
| 5,490,749 A | 2/1996 | Arbues | |
| 5,516,245 A | 5/1996 | Cassidy | |
| 5,775,673 A | 7/1998 | Carnes, Sr. et al. | |
| 5,791,844 A | 8/1998 | Anderson | |
| 6,056,488 A | 5/2000 | Depoy | |

* cited by examiner

LOAD BINDER WITH LOCKING STRUCTURE

BACKGROUND OF THE INVENTION

1. Field of the Invention

The present invention relates generally to the field of load binders used to secure cargo for transport. Particularly, the present invention relates to a locking structure to secure the lever handle of a load binder. More particularly, the present invention relates to a locking structure to secure spring-loaded over-center lever type load binders and to prevent injury or damage as a result of their premature release.

2. Description of the Prior Art

Spring-loaded, over-center load binders are conventionally used to secure cargo in the transportation industry, for example on flatbed trucks, freight trains, cargo ships, and the like. The load binder employs a lever, which is typically comprised of two or more connected components that rotate between an open and closed position about an axis. The components generally include a handle and a receiving cradle. The lever is used to place tension on a hold-down element surrounding the cargo, such as a chain or strap, to hold the cargo in place.

To secure the cargo, the handle of the lever is moved from an open position, where the hold down element is slack, to a closed position, where the hold down element is taut. The hold-down element is pulled taut when the handle has passed the over-center position. When the load binder is closed, the lever components are usually parallel and one may fit inside the other. Pressure on a load binder is released as the operator manually moves the lever handle from the closed position towards the over-center position. While the operator is handling the binder or when the operator is within the vicinity of one or more binders under pressure, premature release of the binder may expose the operator or others to serious personal injury or even death. Premature release may also cause damage to the cargo or other property.

Means to lock load binders are well known in the art. Most load binders available today have some method of securing the lever handle in place after the hold-down element has been pulled taut around the cargo. These methods may include the use of removable locks and locking parts, such as keys or pins. Most have been designed with the aim of preventing premature release of the tension on the hold-down element.

U.S. Pat. No. 3,954,252 discloses a load binder that is secured by attaching a locking part, such as a pin or padlock, to a component of the binder. In this invention, a receiving cradle is comprised of two flanges with aligned circular apertures designed to receive a pin, padlock, or other locking part. The apertures are situated so as to be on either side of the lever handle when it is in a fully closed position. When the handle is closed, the locking part slides through the holes over the handle, preventing it from opening.

There are several disadvantages to using a padlock or straight pin to secure a load binder. For example, when using a padlock, the operator must keep track of a key or remember a combination. As several binders are typically used to secure a load, the padlocks would all have to be keyed or coded the same to prevent confusion. A key is easily bent, lost, or misplaced and thus is not ideal to secure a load binder on its own or in conjunction with a padlock. Where the locking part is a pin, there is a high likelihood the pin may slip out of the apertures upon jarring of the binder caused by moving of the transport vehicle. Using a wire ring or other similar object to secure the pin would further complicate the process. This requires extra steps to properly secure the binder handle and such objects are easily lost.

U.S. Pat. Nos. 4,683,728 and 4,693,097 disclose portable locking devices that may be attached to a binder lock to secure the lever handle with a padlock. U.S. Pat. No. 4,683,728 is comprised of a tube-like component with a flange. With the load binder tight and the lever handle in a fully closed position, the operator slides the invention over the handle with the flange facing the hold-down element, ideally a chain. A padlock is placed through a hole in the flange, the closest link of the chain, and then locked. In this manner, the lever handle is secured and the hold-down element is prevented from slipping.

U.S. Pat. No. 4,693,097 is comprised of a pin affixed centrally to and projecting from the lock's main wall. This projection is flanked by two side-walls. There is a locking chain affixed to one of the sidewalls. The other side-wall has an extension with an opening. When the load binder is tight and the lever handle is in a closed position, the pin fits through the hold-down element, ideally a chain. The locking chain is wrapped around the handle and secured to the opposite side-wall by a padlock placed through the chain and the opening in that side-wall. While these inventions may secure the binder lock, they are inferior to the simplicity and safety of the present invention. A portable lock is most easily attached using two hands—one to hold the device on the binder and the other to attach the padlock to it. For safety reasons, the operator ideally should have one hand on the closed lever handle while securing the binder to prevent accidental release. He or she is forced to choose between safety and ease of attachment.

U.S. Pat. No. 5,775,673 discloses a binder tool that can be used to lock a lever handle in addition to its primary purpose of preventing injury to the operator. This tool is attached to the hold down element by a sliding part and moved towards and under the closed lever handle when the operator desires to open it. It is comprised of a short portion to receive the lever handle, flanges with holes to attach it to the sliding part with a pin, and then a long handle extending upwards from the pin. The tool rotates on the pin and when the operator pulls it towards his or her body, the lever handle is pushed away from the operator as the pressure is released and the lever opens. Although the disclosure suggests that this tool can be designed to fit down over the lever handle and lock it in a variety of ways, no particular method is specified. While this tool may be useful in helping to safely move a load binder lever from the closed to open position, it does not adequately address how to secure the binder when it is in a closed position.

U.S. Pat. Nos. 4,062,206 and 3,974,668 disclose a means of locking a load binder with a key or Allen Wrench. In U.S. Pat. No. 4,062,206, when the hold-down element is taut and the lever is in the closed position, the handle engages a hook and is subsequently locked to the hook with a removable key. U.S. Pat. No. 3,974,668 utilizes a spring-loaded latch to secure the lever handle of a load binder. When the handle is securely latched, the mechanism is locked and can be released with the use of a conventional key or an Allen Wrench. These inventions, while useful, are inferior to the present invention in that they require a detached key or tool to release a locked load binder. Keys and tools are easily misplaced, broken, or stuck. In addition, where load binders are used outdoors the majority of the time, the lock itself may become rusty and unmanageable.

U.S. Pat. No. 3,842,426 discloses a load binder secured by means of a latching system. As the lever handle is pushed down to the closed position, the rotating end of the handle component pops over a raised portion of the receiving component and into a groove. Once secured in the groove, the lever is supposed to be held in place. This invention does not adequately assure the safety of the operator. Without a secure locking structure, even a small amount of force may cause the lever handle to fly open. The disclosure suggests using another method of securing the handle, such as tying wire or rope around the hold-down element and handle in the closed position. This method is impractical and risky, where the operator would need two hands to tie down the handle. This would necessitate removing the hand holding the lever handle in the closed position and would expose the operator to the risks of the handle flying open suddenly and unexpectedly.

U.S. Pat. No. 5,070,582 discloses an integral locking mechanism with counter-rotating gears. This invention comprises a pair of major gear members in engageable connection with a pair of minor gear members attached to a first coupler tension member. A tension connector pin is journaled to both the major gear members and one end of a second coupler tension member. The rotation of the connector pin about the axis of rotation of the major gear members causes the connector pin axis of rotation to be offset relative to the major gear axis of rotation, locking the load binder tool in the closed position. To release the chain, the lever handle is pushed to the open position and the lifting force detaches the handle from the pin. This invention does not provide adequate protection from a premature lever handle release that may subject the operator to injury. With enough force, the handle could disengage from the pin and fly open unexpectedly.

U.S. Pat. No. 4,058,291 discloses a tool for use in securing a chain-type hold-down element. The tool has a tunneled main body portion, through which the chain travels. An opening in the tunnel wall admits a lever that rocks pivotally to the body portion to drive the chain through the tunnel by alternatively engaging and disengaging with it. A fork-shaped component attached to the lever prevents the chain from slipping backwards once it has been tightened. The forked component is lowered down onto the chain and fits through a link to hold it in place. To release the chain, the operator lifts the lever handle, removing the fork from the chain. This invention is inferior to the present invention because it lacks a secure method of locking in place to prevent the forked component from accidentally slipping out and releasing the chain.

U.S. Pat. No. 5,429,463 discloses a removable handle for an operating lever of a load binder for use with a chain hold-down element. The chain is tightened with a toggle linkage and when the lever passes the over-center position, the handle automatically disengages from the lever. The handle is reattached to release the tension on the chain and automatically disengages again when the lever is pushed back past the over-center position. In this manner the operator can theoretically maneuver the lever handle without injury. This invention is inferior to the present invention where it does not disclose a method of securing the lever in place so that the chain is not released prematurely. Additionally, a detachable handle is easily lost or misplaced, detracting from the usefulness of this invention.

The inventions cited here have various advantages and disadvantages with regard to securing load binders, but none combine ease of operability with a high level of assurance against accidental or premature release of the lever handle.

Therefore, what is needed is a load binder that provides reliable protection against premature release of the load binder lever handle and is also easy to operate. What is further needed is a load binder that has a locking structure for securing the binder's lever handle in the closed position. What is still further needed is a load binder with a locking structure that is easy to use and which can be easily secured with one hand, leaving the other hand free to hold the handle in place.

SUMMARY OF THE INVENTION

Load binders place the hold-down elements of a transport vehicle under considerable pressure. Loads that shift during transport may add more strain on a hold-down element. When pressure from a load binder is released, either on purpose or accidentally, the hold-down element has a tendency to give way quickly and with great force. This may cause the load binder lever handle to fly open, possibly causing injury to the operator or property and other persons nearby. If the vehicle is underway, an unexpected release of the lever may cause the load to fall, placing the operator of the transport vehicle and others in the vicinity in danger of suffering personal injury and property damage. The falling cargo itself may also sustain damage.

It is the objective of the present invention to provide a load binder with a locking structure that reduces the occurrence of premature release of the pressure applied to hold-down elements by the load binder. It is another objective of the present invention to provide a load binder with a locking structure that is designed to ensure the corresponding locking part will stay firmly in place until the operator desires to remove it. It is yet another objective of the present invention to provide a load binder with a locking structure that does not require a padlock, key, or other additional detached locking part to unlock the binder. It is still another object of the present invention to provide a superior locking structure to secure the handle of overc-enter lever type load binders in order to prevent injury and damage resulting from premature release of the handle.

The present invention achieves these and other objectives by providing a locking structure with two uniquely shaped apertures and a corresponding locking pin. The structure is an extension of either the lever handle or receiving cradle of a load binder. Each aperture is an opening in a flange connected to either the handle or the cradle. The apertures are shaped such that a small portion of the opening is eccentric to the center axis of the aperture. This eccentric portion may be designed with round edges or right angles. The eccentric portion of the apertures are offset from each other relative to the center axis of the aperture, such that upon looking through one aperture, the eccentric portion of the opposite aperture would appear offset from the eccentric portion of the first aperture.

The locking pin is shaped such that a portion of the pin fits through the eccentric portion of the apertures described above in a mating alignment. In the preferred embodiment, the locking pin has one or more extensions shaped to correspond with the shape of the apertures. The pin has two distinct ends. The first end that fits through both apertures is shaped so that it passes through the apertures and their eccentric portions. The second and opposite end is larger than the apertures so that it will not pass through them. In the preferred embodiment, this larger end is formed such that it is easy to grasp and maneuver. The locking pin may be equipped with a spring attachment to provide a biased resistance of the first end against the nearest flange when the pin is in the securing position. One or both flanges may also be equipped with a small recess or protrusion for the first end of the locking pin locking pin to fit into or over to provide further assurance for holding the pin in place. Optionally, to keep the locking pin in close proportion to the flanges of the load binder for ready use, any of the well-known methods for tethering one part to another may be used, for example a wire or chain.

To secure cargo with a load binder, the operator makes the hold-down element taut by maneuvering the lever handle past the over-center point to a fully closed position. With one hand on the handle to hold it in place for securing, the operator grasps the pin attached to the load binder with his or her free hand. The pin is lined up to fit through the first aperture, rotated to fit through the second aperture, and rotated a final time to lock it in place. The pin extends over the handle where the flanges are part of the receiving cradle, or under the cradle where the flanges are part of the handle. In this manner, the pin secures the handle and prevents it from flying open. The special shape of the pin and the fact that it must be rotated to pass through two separate apertures assures that it will stay in place until the operator intends to remove it. When the operator desires to release the load binder, he or she will simply hold down on the handle as they remove the pin, rotating in reverse order to pass it back through the apertures.

These specially shaped apertures and pin are an improvement over prior methods for locking load binders where they offer additional protection against premature release of the load binder lever handle. The rotation of the pin to prevent it from sliding back through the apertures will prevent accidental release of the load binder lever handle controlling the hold-down element. The present invention is also an improvement where it is easily operated with one hand and the pin is attached to the load binder to prevent breakage or loss.

The present invention is designed for load binders already in use and those that may be developed. As an add-on kit for improving existing load binders, the present invention is simple to attach. The flanges can be easily spot-welded to either the lever handle or receiving cradle of a load binder. The pin could be tethered to one flange. Further objects and advantages of this invention will be made apparent in the following description, references being made to the accompanying drawings illustrating the preferred embodiment of the invention.

DETAILED DESCRIPTION OF THE PREFERRED EMBODIMENT

For the purposes of promoting an understanding of the principles of the present invention, references will now be made to one of the preferred embodiments of the present invention as illustrated in FIGS. 1–5, using specific language to describe the same.

Figure 1:
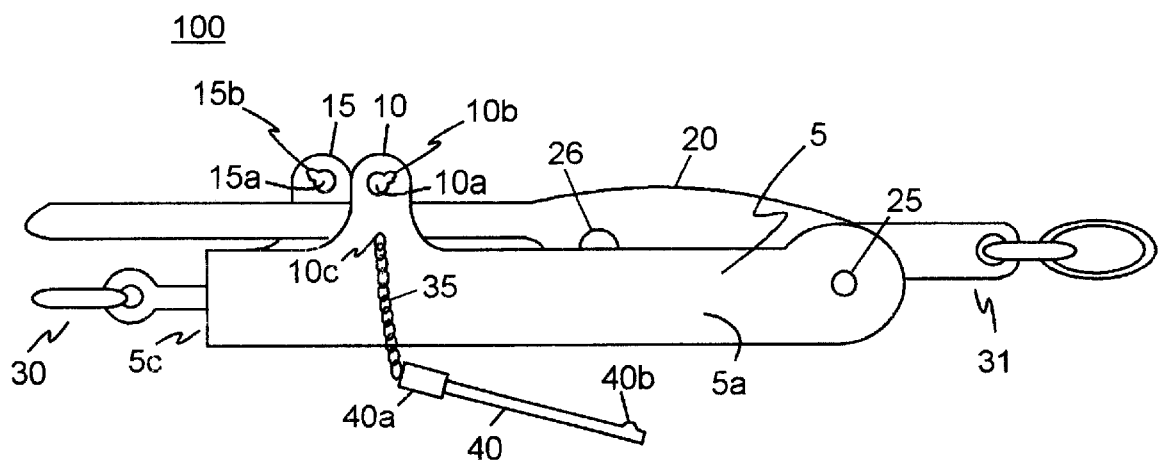
FIG. 1 is a perspective view of a preferred embodiment of the present invention.

Referring now to FIG. 1, load binder 100 is used to tighten and secure hold-down elements for transporting cargo. Flatbed trucks, railroad cars, and cargo ships are examples of the types of transport methods that will best utilize the present invention. Load binder 100 and corresponding parts are preferably made from a metal material exhibiting the desired characteristics required for load binders. It is preferably used with a chain-type hold-down element, although other types of hold-down elements are not excluded.

Load binder 100 is comprised of receiving cradle 5, flanges 10 and 15, lever handle 20, pivot point 25, hold-down element attachments 30 and 31, locking pin tether 35, and locking pin 40. Receiving cradle 5 has two wall portions, 5a and 5b (not shown), connected by two end portions, 5c. Receiving cradle 5 may also be described as a clevis-type member with two spaced arms. Flanges 10 and 15 are flat extensions of receiving cradle 5. Flange 10 is attached to wall portion 5a and flange 15 is attached to wall portion 5b such that flanges 10 and 15 are directly opposite each other. Flange 10 has an aperture 10a and flange 15 has an aperture 15a. Apertures 10a and 15a are circular with a portion of their opening eccentric to the center of each aperture. The eccentric portion 10b of aperture 10a on flange 10 is situated so that it is offset from the eccentric portion 15b of aperture 15a on flange 15.

Flange 10 may have connection point 10c for the purpose of attaching locking pin tether 35. Locking pin tether 35 is fabricated from any flexible and durable material known to those skilled in the art that is commonly used for tethering two components together. Locking pin tether 35 is in turn attached to locking pin 40 by a method commonly used in the art. Locking pin 40 has a grip portion 40b of a shape that allows a person to grasp and maneuver locking pin 40. Locking pin 40 has one or more extensions 40b shaped to coincide with the apertures 10a and 15a in flanges 10 and 15.

The distance between the walls of receiving cradle 5 is ideally of a length that permits an intermediate portion of lever handle 20 to fit in between flanges 10 and 15 when lever handle 20 is in a load tightening position. Lever handle 20 is attached to receiving cradle 5 at pivot point 25 by a pin or other similar method commonly used in the art so that lever handle 20 pivots about pivot point 25 as it opens and closes from a release position to a load tightening position, respectively. A first hold down element attachment 30 extends from one end of receiving cradle 5 opposite from pivot point 25. A second hold down element attachment 31 is connected to a second pivot point 26 on lever handle 20 for relative pivotal movement about a second axis offset from the first pivotal axis of pivot point 25. Second pivot point 26 is located such that when the lever handle 20 is in a load tightening position the second pivot point 26 is slightly overcenter with respect to pivot point 25.

Figure 2:
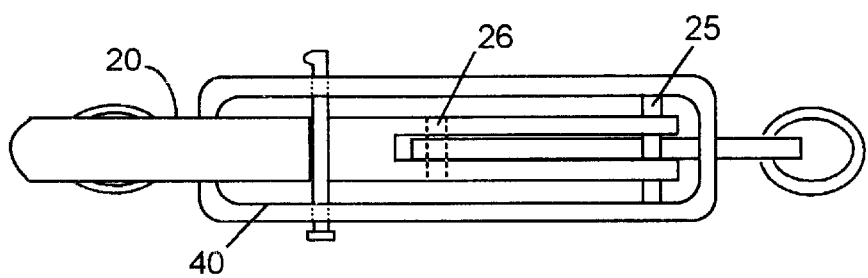
FIG. 2 is an overhead perspective view of a preferred embodiment of the present invention, showing the locking pin securing the lever handle in the closed position.

FIG. 2 shows a perspective overhead view of a preferred embodiment of load binder 100 such that locking pin 40 is visibly secured in place through apertures 10a and 15a (not shown) of flanges 10 and 15 (not shown) over lever handle 20 in the closed position. FIG. 2 illustrates that when locking pin 40 is placed through apertures 10a and 15a and rotated to secure it in place, locking pin 40 prevents lever handle 20 from flying open accidentally.

Figures 3, 3A:
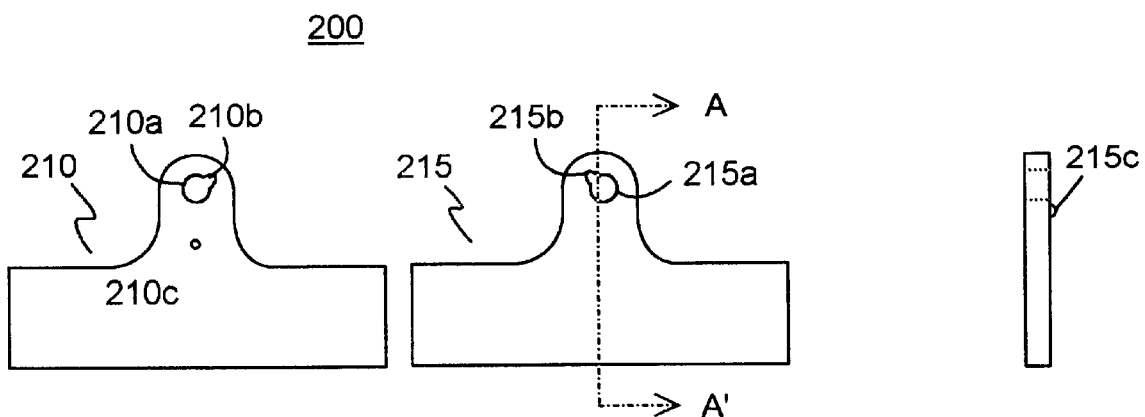
FIG. 3 is a side view of the flanges of a preferred embodiment of the present invention in FIG. 1, shown as components of an add-on kit to be attached to a load binder handle or cradle.

FIG. 3 shows a side view of the flanges of an embodiment of load binder 100 as they would be included in an add-on kit 200 to improve the security of load binders already in use. Flanges 210 and 215 are shown with apertures 210a and 215a. Apertures 210a and 215a are shown with eccentric portions 210b and 215b. In this particular embodiment, the offset portion 210b of aperture 210a is shaped to accept an extension of a locking pin. Offset portion 210b, situated eccentrically from the center axis of the aperture, is situated perpendicular relative to offset portion 215b of aperture 215a at approximately a ninety-degree angle. When a corresponding locking pin has been placed correctly through flanges 210 and 215, it is rotated such that an indent in a locking pin may fit over protrusion 215c on flange 215. Connection point 210c on flange 210 provides an opportunity to attach a locking pin via a tethering mechanism.

Flat portions 210d and 215d of flanges 210 and 215 may be spot-welded to an existing load binder to convert it for secure use. Flanges 210 and 215 must be mounted on either a receiving cradle or lever handle of the load binder so that they are directly opposite each other. It should be understood that any of the conventional methods for welding one metal piece to another may be used to accomplish this purpose.

Figure 4:
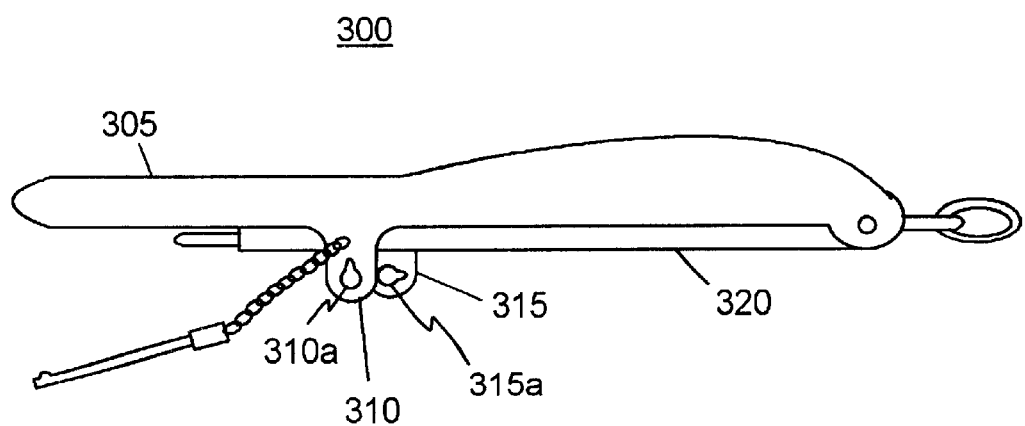
FIG. 4 is a perspective view of another embodiment of the present invention, showing the flanges attached to the lever handle and extending down over the cradle.

FIG. 4 shows another embodiment of the present invention. Load binder 300 is comprised of lever handle 305, flanges 310 and 315, receiving cradle 320, pivot point 325, hold-down element attachments 330, and locking pin 335. In this embodiment, flanges 310 and 315 are attached to lever handle 305, rather than to the receiving cradle as in FIG. 1 above. This embodiment is secured in a similar manner as the preferred embodiment in FIG. 1, except that the apertures 310a and 315a are located in flanges 310 and 315 attached to the lever handle 305, so that a locking pin is placed through the flanges and under receiving cradle 320.

Figure 5:
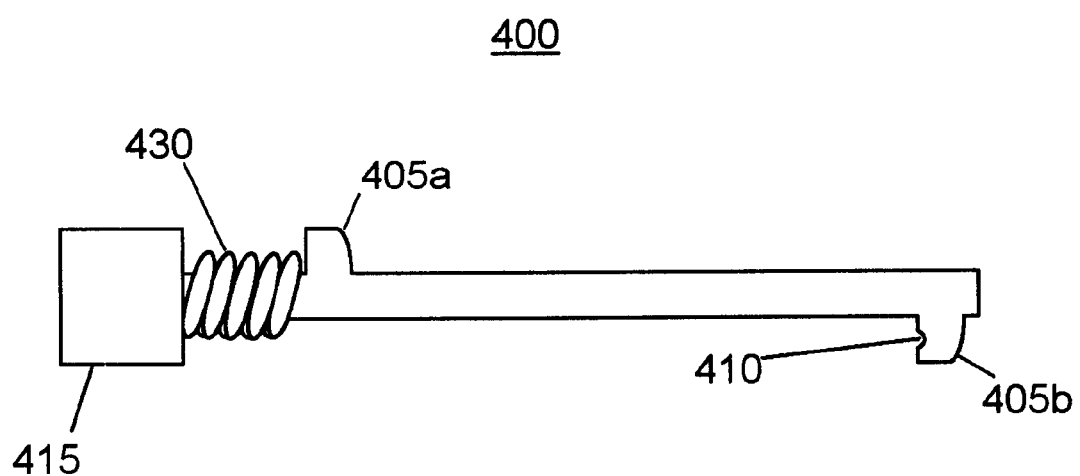
FIG. 5 is a side view of a preferred embodiment of a locking pin to be used in conjunction with an embodiment of the invention in FIG. 1.

FIG. 5 shows another embodiment of the locking pin described in FIG. 1. Locking pin 400 is comprised of extensions 405a and 405b, recess 410, grip portion 415, and spring 430. Extension 405a protrudes from the pin perpendicular relative to extension 405b at approximately a ninety-degree angle. Recess 410 is shaped and placed such that it fits into a corresponding protrusion on the flange of the preferred embodiment of the invention described in FIG. 1 or another embodiment of the present invention with a similar feature. Grip portion 415 is shaped so that it is easy to grasp and maneuver locking pin 400 in order to secure a load binder in the manner described in FIG. 1. Spring 420 is situated between extension 405a and grip portion 415 to provide further resistance and security when locking pin 400 is rotated in place to secure a load binder handle.

To secure a load binder as described in FIG. 1, lever handle 20 is rotated on pivot point 25 and maneuvered to a closed position, tightening the hold-down elements connected to attachments 30 and 31. With one hand on lever handle 20 to hold it in place, the operator grasps locking pin 40, which is attached to receiving cradle 5 at connection point 10c with locking pin tether 35. The operator lines up locking pin 40 with flange 10 so that it will fit through the eccentric portion 10b of aperture 10a on that flange. The operator pushes locking pin 40 through aperture 10a until it reaches flange 15. The operator then must rotate the locking pin 40 ninety degrees so that its extension lines up with the eccentric portion 15b of aperture on flange 15. The operator then pushes locking pin 40 further through apertures 10a and 15a on flanges 10 and 15 and rotates the pin another ninety degrees to secure it in place.

As the locking pin is rotated for the final time, a recess (not shown) in locking pin 40 fits over a protrusion (not shown) on flange 15, holding the pin in place so that it will not rotate backwards without force. The load binder is then locked in place and the operator may remove the hand holding lever handle 20.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A load binder with locking structure comprising:
   a bifurcated cradle portion defining two spaced arms, said cradle portion having a first cradle end with a first tension element and a second cradle end;
   an actuating handle having a swinging component portion at a first end;
   a first pivotal connection operatively connected to said second cradle end and a second end of said handle for relative swinging movement about a first pivotal axis between a load tightening position and a release position wherein an intermediate portion of said handle and said first axis is received between said two arms of said cradle portion;
   a second pivotal connection operatively connecting a second tension element to said handle for relative pivotal movement about an axis offset from said first pivotal axis at a location to be overcenter with respect to said first axis when said handle is in a load tightening position; and
   a locking pin having an elongated member with a first eccentric portion located near or on a first end;
   wherein said two spaced arms of said cradle portion each has a flange portion projecting outwardly beyond said intermediate portion of said handle when in said load tightening position wherein each flange portion contains an aperture having an eccentric portion adapted to receive therethrough said eccentric portion of said locking pin, wherein said apertures are aligned with each other along an aperture axis and wherein said eccentric portion of one flange portion is offset from said eccentric portion of said other flange portion.

2. The load binder of claim 1 wherein said second end of said handle is bifurcated to form two spaced projections between which said second tension element is received and to which said second tension element is pivotally connected by said second pivotal connection.

3. The load binder of claim 1 further comprising a flexible member having a first flexible member end attached to said locking pin and a second flexible member end attached to said cradle portion.

4. The load binder of claim 1 wherein a second end of said locking pin is T-shaped.

5. The load binder of claim 1 wherein said locking pin has a second eccentric portion along said elongated member spaced from said first eccentric portion.

6. The load binder of claim 1 wherein said locking pin has a biasing spring located about said elongated member adjacent said second end of said locking pin.

7. A load binder locking structure kit comprising:
   a pair of elongated metal plates wherein each plate has a flange portion extending from one side wherein each flange portion has an aperture in said flange portion having an eccentric portion wherein said eccentric portion of said aperture in one flange portion is offset from said eccentric portion of said aperture in the other flange portion; and
   a locking pin having an elongated member with a first eccentric portion located near or on said first end, said locking pin adapted to be slidably inserted through said apertures of said pair of elongated metal plates.

8. The kit of claim 7 wherein said locking pin further includes a biasing spring located about said elongated member spaced from said first end.

9. The kit of claim 7 further including a flexible tethering member having one end adapted to be attached to a handle end of said locking pin and on another end adapted to be attached to one of said pair of metal plates.

10. A method of using a load binder with a locking structure comprising:

swinging a load binder handle from a release position to a load tightening position of a load binder that is interconnected between two tensioning members;

aligning an eccentric portion of a locking member with a corresponding eccentric portion on a first flange aperture of a first flange located on a cradle portion of said load binder wherein an intermediate portion of said binder handle is below said flange aperture when said binder handle is in said load tightening position;

sliding said locking member across said intermediate portion of said binder handle to a second flange aperture of a second flange located on said cradle portion of said load binder;

aligning said eccentric portion of said locking member with a corresponding eccentric portion on said second flange aperture; and sliding said locking member through said second aperture.

11. The method of claim 10, further including turning said locking member to offset said eccentric portion of said locking member from said eccentric portion of said second flange aperture.

12. A method of using a binder locking structure kit comprising:

obtaining a first flange having a first flange aperture located in an outwardly projecting portion of said first flange wherein said first flange aperture has an eccentric portion;

securing said first flange to a first arm of a binder cradle adapted to receive an intermediate portion of a binder handle wherein said first flange is secured to said first arm so that said first flange projecting portion projects outwardly beyond said intermediate portion of said handle when in a load tightening position;

obtaining a second flange having a second flange aperture located in an outwardly projecting portion of said second flange wherein said second flange aperture has an eccentric portion offset from said eccentric portion of said first flange aperture;

securing said second flange to a second arm of said binder wherein the center axis of said second flange aperture is aligned with the center axis of said first flange aperture; and providing a locking member adapted to slidably engage said first flange aperture and said second flange aperture when said first flange and said second flange are secured to said binder cradle.

13. The method of claim 12 further comprising:

attaching a first end of a flexible tethering member to a handle end of said locking member; and attaching a second end of said tethering member to one of said first flange and said second flange.

\* \* \* \* \*